United States Patent
Billig

(10) Patent No.: US 7,315,776 B2
(45) Date of Patent: Jan. 1, 2008

(54) CONTROL DEVICE FOR AN AT LEAST PART-TIME FOUR-WHEEL-DRIVE MOTOR VEHICLE

(75) Inventor: Christian Billig, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/336,925

(22) Filed: Jan. 23, 2006

(65) Prior Publication Data

US 2006/0122757 A1 Jun. 8, 2006

Related U.S. Application Data

(63) Continuation of application No. PCT/EP2004/008148, filed on Jul. 20, 2004.

(30) Foreign Application Priority Data

Jul. 24, 2003 (DE) ................. 103 33 652

(51) Int. Cl.
*F16D 48/12* (2006.01)
*G06F 19/00* (2006.01)

(52) U.S. Cl. ............... 701/69; 701/67; 701/68; 701/29; 180/248; 192/54.1

(58) Field of Classification Search .......... 701/67, 701/68, 69, 29, 34; 180/247, 248; 192/54.1; 477/171, 179, 181
See application file for complete search history.

(56) References Cited

U.S. PATENT DOCUMENTS 4,895,236 A * 1/1990 Sakakibara et al. ........ 192/84.6
5,497,333 A * 3/1996 Sasaki ..................... 701/72
5,611,407 A * 3/1997 Maehara et al. ........... 180/249
5,957,985 A 9/1999 Wong et al.

(Continued)

FOREIGN PATENT DOCUMENTS

DE     4329852 C2    3/1994

(Continued)

OTHER PUBLICATIONS

International Search Report for PCT/EP2004/008148 dated Dec. 2, 2004.

(Continued)

*Primary Examiner*—Tan Q. Nguyen
(74) *Attorney, Agent, or Firm*—Crowell & Moring LLP

(57) ABSTRACT

In the case of a control device for an at least part-time four-wheel-driven motor vehicle, having a control unit which can variably distribute the driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by an actuator device at the transfer clutch, the control unit consists of a main control unit and an additional control unit, the main control unit computing the desired clutch torque as a function of detected and/or determined parameters, which clutch torque is transmitted to the additional control unit, and the additional control unit converting the desired clutch torque to a corresponding electric control signal for the actuator device.

4 Claims, 2 Drawing Sheets

U.S. PATENT DOCUMENTS

| | | | |
|---|---|---|---|
| 6,274,942 B1 * | 8/2001 | Pels | 290/40 B |
| 6,557,680 B2 * | 5/2003 | Williams | 192/27 |
| 6,594,572 B1 * | 7/2003 | Amendt et al. | 701/48 |
| 2002/0035003 A1 | 3/2002 | Brown et al. | |
| 2002/0107628 A1 | 8/2002 | Ryuzo | |
| 2003/0114975 A1 * | 6/2003 | Berger et al. | 701/55 |
| 2006/0015234 A1 * | 1/2006 | Luh | 701/51 |

FOREIGN PATENT DOCUMENTS

| | | | |
|---|---|---|---|
| DE | 19736931 A1 | 3/1999 | |
| DE | 19917215 | * | 10/2000 |
| DE | 19919537 A1 | 11/2000 | |
| DE | 10054023 A1 | 5/2002 | |
| EP | 1415850 A2 | 5/2004 | |
| WO | WO 00/29243 | 5/2000 | |

OTHER PUBLICATIONS

German Examination Reports for 103 33 652.4-51.

* cited by examiner

US 7,315,776 B2

CONTROL DEVICE FOR AN AT LEAST PART-TIME FOUR-WHEEL-DRIVE MOTOR VEHICLE

CROSS-REFERENCE TO RELATED APPLICATIONS

The present application is a continuation of International Patent Application No. PCT/EP2004/008148, filed Jul. 20, 2004, and claims priority under 35 U.S.C. § 119 to German Application No. 103 33 652.4-51, filed Jul. 24, 2003. The entire disclosure of the aforementioned documents is herein expressly incorporated by reference. This application contains subject matter which is related to the subject matter contained in application Ser. Nos. 11/336,922, 11/336,934, 11/337,047, and 11/336,933 filed on even date herewith.

BACKGROUND AND SUMMARY OF THE INVENTION

The present invention relates to a control device for an at least part-time four-wheel-driven motor vehicle. More particularly, the present invention relates to a control device for an at least part-time four-wheel-driven motor vehicle, having a control unit which variably distributes driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by an actuator device at the transfer clutch.

A control device of this type is described, for example, in German Patent Document DE 100 54 023 A1. Accordingly, a torque distribution device is known for changing the torque distribution ratio between the wheels of the front axle and the wheels of the rear axle by a corresponding control of a friction clutch as a longitudinal blocking device (i.e., transfer clutch).

In general, as described below, primary driving wheels are the wheels which are permanently connected with the drive unit, and secondary driving wheels are the wheels which, if required, can be connected with the drive unit by way of the transfer clutch.

In the case of the known control devices, only one control unit is known for controlling or regulating the torque distribution or the clutch torque at the transfer clutch, which control unit computes the desired clutch torque and converts the computed desired clutch torque to an electric control signal for the actuator device of the transfer clutch.

It is an object of the present invention to improve a control system of the previously mentioned type with a view to improving the precision of the control, while the expenditures and costs are simultaneously reduced.

The present invention is based on the recognition that a physical division of the control unit into a master-like main control unit and into an additional control unit in the form of an intelligent final stage has the following advantages.

By using input signals and physical models, which normally are present in certain motor vehicle systems for other driving-dynamics-related control functions, as parameters in the main control unit, an unrestrictedly precise driving-dynamics-related driving performance can be provided. This can be achieved without additional expenditures if the main control unit is integrated in a control device, which has already been provided for other driving-dynamics-related systems. The electronic control device for the brake controlling functions (known, for example, by the abbreviations ABS/ASC, DSC, FDR) is particularly advantageous for this purpose.

Furthermore, an improvement of emergency running characteristics may be achieved as a result of possible redundancies.

Other objects, advantages and novel features of the present invention will become apparent from the following detailed description of the invention when considered in conjunction with the accompanying drawings.

DETAILED DESCRIPTION OF THE DRAWINGS

Figure 1:
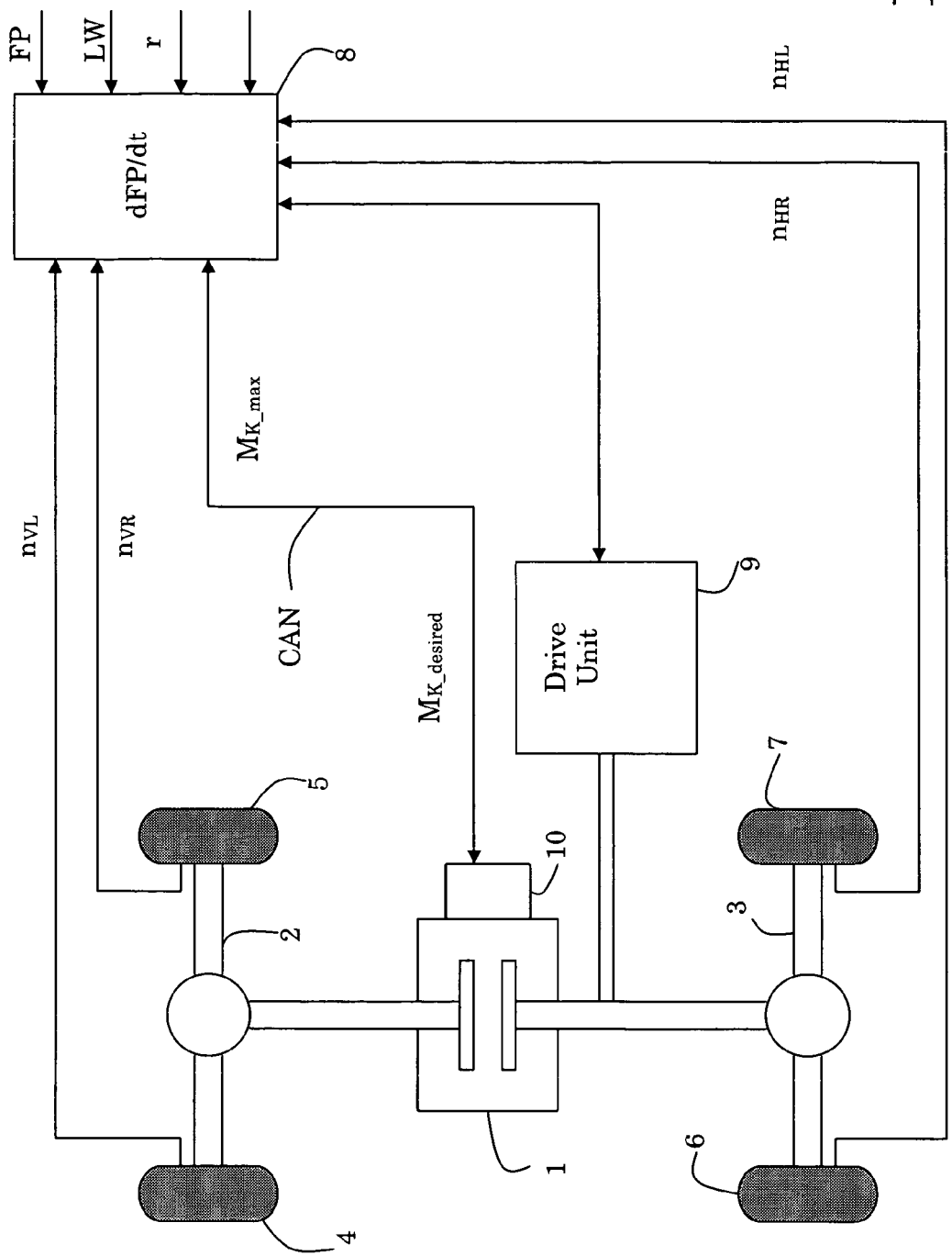
FIG. 1 is a schematic view of a part-time four-wheel-driven vehicle having a transfer clutch, which can be adjusted by way of a main control unit and an additional control unit, on the example of a basically rear-wheel-driven motor vehicle having a front wheel drive which can be connected by way of a transfer clutch, in accordance with the present invention.

FIG. 1 illustrates a part-time four-wheel-driven vehicle in the form of a basically rear-wheel-driven motor vehicle having a front-wheel drive, which, if required, can be connected by way of a transfer clutch 1. The transfer clutch 1 can be adjusted by way of a control unit consisting of a main control unit 8 and an additional control unit 10. The additional control unit 10 is spatially separated from the main control unit 8 and arranged in proximity of the transfer clutch 1.

The main control unit 8, which may be part of an electronic driving-dynamics controlling control device, may compute a desired clutch torque $M_{K\_desired}$ (compare also FIG. 2) as a function of parameters detected and/or determined in the control device. The desired clutch torque $M_{K\_desired}$ may be transmitted by way of the known vehicle data bus CAN to the additional control unit 10. The additional control unit 10 may convert the desired clutch torque $M_{K\_desired}$ to a corresponding electric control signal for the actuator device (for example, to a current signal for an electric motor connected with the transfer clutch 1).

The additional control unit 10 may receive further input quantities by way of the data bus CAN, by means of which input quantities the additional control unit 10 can carry out an emergency running function in the event of a defined defect.

In the case of a vehicle according to FIG. 1, while the transfer clutch 1 is open, the entire torque (driving torque) of the drive unit 9 is transferred to the wheels 6 and 7 of the rear axle 3. The drive unit 9 may include an internal-combustion engine, a transmission, and at least one drive control device (not shown here in detail). The drive control device may communicate, for example, also by way of the known motor vehicle data bus CAN with the main control unit 8 and the additional control unit 10. In FIG. 1, the rear wheels 6 and 7 are the primary driving wheels, because they are permanently connected with the drive unit 9. As the clutch torque at the transfer clutch 1 increases, the drive unit 9 also drives the wheels 4 and 5 of the front axle 2. The front wheels 4 and 5 are, therefore, the secondary driving wheels.

The main control unit 8 detects or determines, for example, the following parameters (compare also FIG. 2) for determining the desired clutch torque $M_{K\_desired}$: the accelerator pedal position FP, the speed of the accelerator pedal operation dFP/dt, the rotational engine speed $n_{Mot}$, the engine torque (e.g., internal-combustion engine torque) or the drive torque ($M_{Ant}$ (e.g., transmission output side cardan shaft torque), the steering angle LW, the yaw rate or yaw angle rate r, and the rotational wheel speeds $n_{VL}$, $n_{HL}$, $n_{VR}$, and $n_{HR}$ of all wheels 4, 5, 6, and 7, respectively. In connection with additional information present in the main control unit 8, the wheel speeds of $v_{VL}$, $v_{HL}$, $v_{VR}$, and $v_{HR}$ of all wheels 4, 5, 6, and 7, respectively, as well as the vehicle speed v are determined from these rotational wheel speeds $n_{VL}$, $n_{HL}$, $n_{VR}$, and $n_{HR}$.

Figure 2:
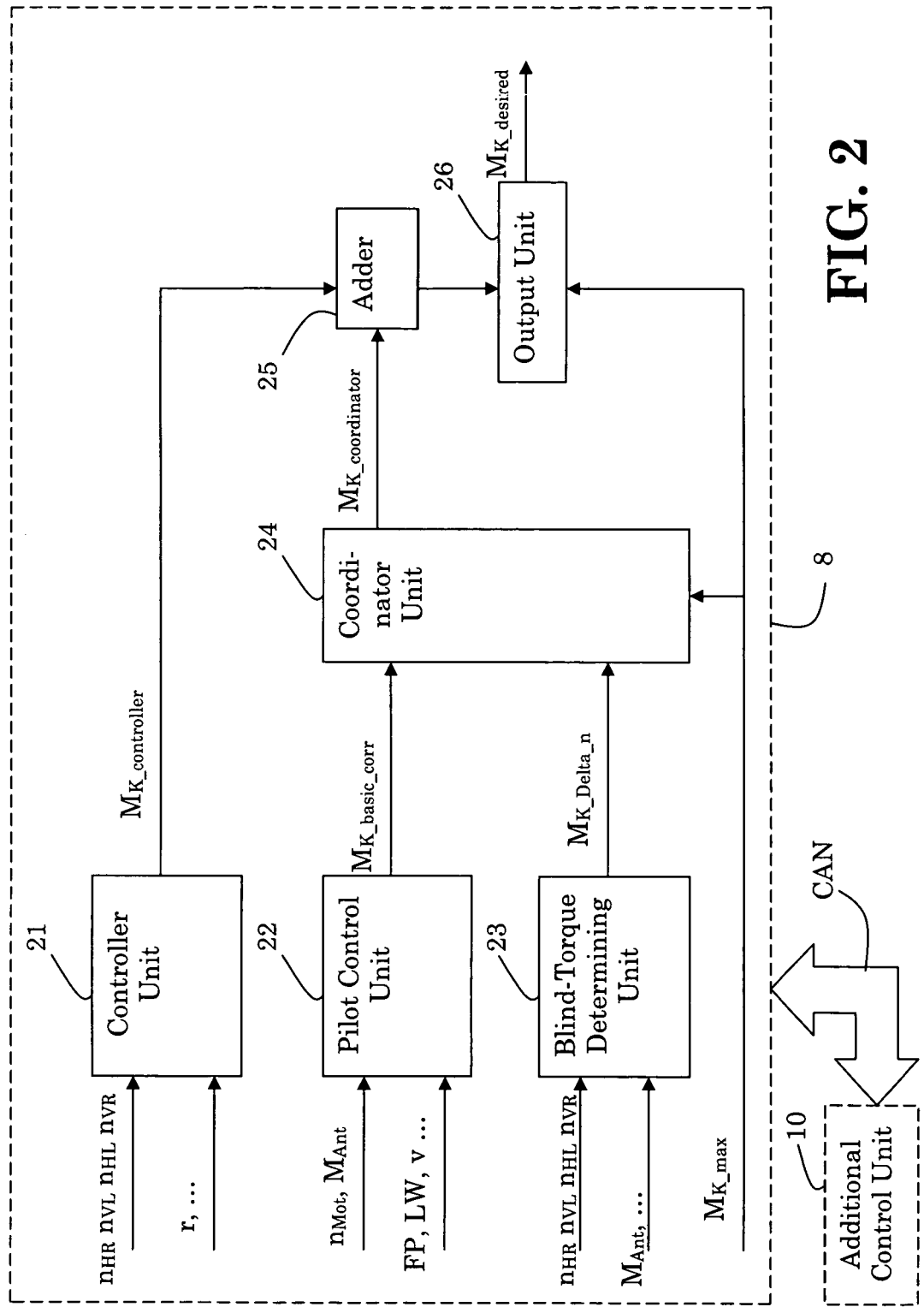
FIG. 2 illustrates an exemplary embodiment of a main control unit and an additional control unit, in accordance with the present invention.

FIG. 2 illustrates additional details of an exemplary embodiment of a main control unit 8 and an additional control unit 10.

While taking into account the wheel slip and driving-dynamics-related quantities, such as oversteering and understeering, a driving-dynamics-related control fraction $M_{K\_controller}$ for determining the desired clutch torque $M_{K\_desired}$ is determined in the main control unit 8 by means of the controller unit 21.

In a pilot control unit 22, a corrected basic pilot control fraction $M_{K\_basic\_corr}$ may be determined and may be outputted to a coordinator unit 24. In a blind-torque determining unit 23, a wheel-slip-related blind torque $M_{K\_Delta\_n}$ can be determined and can also be outputted to the coordinator unit 24. Blind torques are interference torques which may lead to a twisting of the transmission line, for example as a result of different tire circumferences. The blind torque $M_{K\_Delta\_n}$ may be determined as a function of the wheel speeds, the engine or driving torque, the vehicle weight and tire tolerance factors. The blind-torque determining unit 23 and/or the coordinator unit 24 may be implemented in exemplary embodiments of the present invention. The pilot control unit 22 can also be connected directly with the adder 25.

The output torque $M_{K\_coordinator}$ of the coordinator unit 24, which usually corresponds to the corrected basic pilot control fraction $M_{K\_basic\_corr}$, may be transmitted to the adder 25. In the adder 25, the adding-up of the output torque $M_{K\_coordinator}$ of the coordinator unit 24 and the control fraction $M_{K\_controller}$ related to driving dynamics may take place. In the output unit 26, the desired clutch torque $M_{K\_desired}$ to be actually set may be determined and outputted to the additional control unit 10.

The desired clutch torque $M_{K\_desired}$ to be set may be determined by the control unit 8 basically by adding up the corrected basic pilot control fraction $M_{K\_basic\_corr}$ (standard pilot control) and a driving-dynamics-related control fraction MK controller unless another rule obtains a higher priority, for example, by the coordinator unit 24 or by the output unit 26. The output unit 26 receives as an input signal, by way of the data bus CAN, from the additional control unit 10, a maximally permissible limit torque $M_{K\_max}$ defined by the degree of stress to the actuator device. For this purpose, a mathematical power loss model is present in the additional control unit 10, which takes into account particularly the degree of stress to the actuator device (for example, electric motor) and the oil disks of the transfer clutch 1. This limit torque $M_{K\_max}$ can also be taken into account in the coordinator unit 24.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control device for an at least part-time four-wheel-driven motor vehicle, having a control unit which variably distributes driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by an actuator device at the transfer clutch,
   wherein the control unit consists of a main control unit and an additional control unit, the main control unit computing the desired clutch torque as a function of detected or determined parameters, the desired clutch torque being transmitted to the additional control unit, and the additional control unit converting the desired clutch torque to a corresponding electric control signal for the actuator device;
   wherein the main control unit and the additional control unit are connected with one another by way of a CAN data bus;
   wherein the additional control unit is spatially separated from the main control unit and is arranged in proximity of the transfer clutch; and
   wherein the additional control unit receives additional input quantities with which the additional control unit can carry out an emergency running function in the event of a defined defect.

2. The control device according to claim 1, wherein the main control unit is integrated in the control device which is also provided for other driving-dynamics-related control functions.

3. A method for controlling an at least part-time four-wheel-driven motor vehicle, comprising the acts of:
   variably distributing driving torque of a drive unit to primary driving wheels, which are permanently connected with the drive unit, and to secondary driving wheels which are connectable to the drive unit through a transfer clutch;
   determining a desired clutch torque which is to be set by an actuator device at the transfer clutch;
   computing the desired clutch torque as a function of detected or determined parameters, wherein the control unit consists of a main control unit and an additional control unit;
   transmitting the desired clutch torque to the additional control unit;
   converting the transmitted desired clutch torque to a corresponding electric control signal for the actuator device;
   connecting the main control unit and the additional control unit with a CAN data bus;
   spatially separating the additional control unit from the main control unit and arranging the additional control unit in proximity of the transfer clutch; and
   receiving additional input quantities with which the additional control unit can carry out an emergency running function in the event of a defined defect.

4. The method of claim 3, further comprising the act of:
   integrating the main control unit in the control device, wherein the control unit is provided for other driving-dynamics-related control functions.

* * * * *